United States Patent [19]

Palardy et al.

[11] Patent Number: 5,681,432
[45] Date of Patent: Oct. 28, 1997

[54] INHIBITION OF ORGANIC DEPOSITION USING ADDITIVES TO RETARD SETTLING

[75] Inventors: William J. Palardy, Chalfont; Nancy A. DiAngelo, Feasterville, both of Pa.

[73] Assignee: BetzDearborn Inc., Trevose, Pa.

[21] Appl. No.: 547,754

[22] Filed: Oct. 25, 1995

[51] Int. Cl.$^6$ ............................................. B01D 3/34
[52] U.S. Cl. ..................... 203/7; 159/DIG. 13; 210/698; 426/493
[58] Field of Search ................... 203/6–7, 18–19; 127/61; 210/698; 159/DIG. 13; 252/180, 181; 426/493; 568/913; 208/47, 48 AA, 48 R

[56] References Cited

U.S. PATENT DOCUMENTS

| | | | |
|---|---|---|---|
| 3,483,033 | 12/1969 | Casey | 127/61 |
| 3,518,204 | 6/1970 | Hansen et al. | 252/181 |
| 4,345,973 | 8/1982 | Ladisch et al. | 203/19 |
| 4,929,361 | 5/1990 | Polizzotti | 210/698 |
| 5,336,414 | 8/1994 | DiAngelo | 210/698 |

FOREIGN PATENT DOCUMENTS 8103271  10/1994  Japan .

OTHER PUBLICATIONS

Divies et al, "Immobilized Cell Technology in Wine", Abstract, 1994, CA 122:8228.
Gestrelius, "Potential application of immobilized viable cells in the food industry", 1982, CA 98:32997.

*Primary Examiner*—Virginia Manoharan
*Attorney, Agent, or Firm*—Alexander D. Ricci; Richard A. Paikoff

[57] ABSTRACT

Methods for inhibiting organic fouling of heat transfer surfaces in contact with an alcohol distillation stream are discussed. The methods include adding to the alcohol distillation stream an effective inhibiting amount of a treatment including a high molecular weight anionic polymer.

5 Claims, No Drawings

INHIBITION OF ORGANIC DEPOSITION USING ADDITIVES TO RETARD SETTLING

FIELD OF THE INVENTION

The present invention is directed to a method for controlling organic deposition on heat transfer surfaces. More specifically, the present invention is directed to the use of anionic polymeric materials to control organic deposition in an alcohol distillation stream.

BACKGROUND OF THE INVENTION

The present invention relates to the control of fouling by protein-containing fluids in distillation systems. Ethanol is produced by the fermentation of simple sugars by yeast. The ethanol is harvested by distillation of the fermentation process effluent. Fouling in the "beer still" used in the production of ethanol from corn (the first distillation step) prevents optimum column performance, decreasing process yields and increasing operating costs. The fouling results from accumulation of proteinaceous material typically present as suspended solids in the fermentation process effluent. These solids result primarily from yeast propagation in the fermentation process and are by nature different than other protein slurries in the wet milling process. Column boilouts with caustic solution are needed to restore proper distillation process performance. Reducing the frequency of or eliminating the need for these boilouts will likely result in reduced raw material costs (for boilout chemicals), improved thermal efficiency of the distillation process, and increased production capability due to less downtime.

The present invention relates to the inhibition of proteinaceous deposits in distillation systems through the use of anionic polymers, including carboxymethylcelluose (CMC), sodium alginate, other naturally occurring gums (e.g., carageenan, etc.) and/or any combination of any or all of these ingredients. It has been discovered that by adding one or more of these ingredients to an alcohol distillation stream at a treatment effective for the purpose, preferably at from about 0.1 to 100 ppm, a significant decrease in the density of the settled solids and a reduction in the cohesiveness of these solids occurs. It is theorized that, by lowering the settled bed density, the bed will be more easily disturbed by tray turbulence, thereby reducing the quantity and rate of solids buildup, resulting in extended times between distillation process boilouts and yielding the benefits previously noted.

DETAILED DESCRIPTION OF THE INVENTION

The present invention relates to a process for inhibiting organic fouling of heat transfer surfaces in contact with an aqueous solution comprising adding to the solution an effective inhibiting amount of a high molecular weight (50,000–300,000 preferred, with a molecular weight of 100,000–200,000 particularly preferred) anionic polymer, wherein said anionic polymer is preferably selected from the group consisting of carboxymethylcellulose, metal (e.g., sodium) alginate, other naturally occurring gums (e.g., carageenan), or mixtures thereof. The efficacy of these polymers is believed to be related to their ability to adsorb onto the suspended solids and impact a high negative surface charge. It is also theorized that the increased efficacy of the higher molecular weight polymers is attributable to their ability to bind simultaneously to several protein particles. Since these proteins are similarly charged, particle agglomeration and bed compaction are impacted by both electrostatic and steric effects. Note that not all anionic polymers yielded this result. For instance, a polyoxyethylene (20) sorbitan monooleate (Polymer A) and a gum arabic (a natural gum, Polymer B) were found to be ineffective.

In laboratory experiments, a two-phase approach was designed to simulate the settling of beer still solids. The first phase of testing ("static") measured the quantity and rate of settling in a slurry unagitated by vapor flow. This maximized the amount of settled solids and allowed for expedient preliminary screening of treatments. The second phase of testing ("dynamic") was conducted on treatments identified as effective in the static tests, and incorporated the impact of vapor flow in the still on settling rates, bed depth, and bed density.

Experiments were conducted according to the following method: Beer still bottoms were preheated to 200° F. in the bath, and a 300 ml aliquot was transferred into a 500 ml graduated cylinder. Treatment was added as the slurry was transferred into the cylinder. The cylinder was then placed in a bath maintained at 200° F. For the dynamic tests, an air sparger was placed in the cylinder to a depth of 150 ml and heated air was sparged into the slurry. After 40 minutes, the sediment height was recorded. Sediment heights that were greater than that for a control (i.e., untreated slurry) indicated that the treatment reduced the tendency of the solids to settle and concentrate.

The largest change in sediment height was obtained with a high viscosity sodium carboxymethylcellulose. A low viscosity sodium carboxymethylcellulose and sodium alginate also showed some activity. A feed rate study was conducted, with results indicating that feed rates as low as 0.1 ppm were effective.

Note that less sediment was obtained when air sparging was used. A greater difference in sediment height between treated and control samples was observed with no air sparging. This was in fact expected, and is reflective of how vapor bubbles impede settling rates. Because of the small sediment height for the air sparged tests, measurements show more variance than for the static tests. Also, the air velocity used in testing was lower than the vapor velocities experienced in a still. At higher air velocities, sufficient sediment could not be obtained in a reasonable period of time to obtain measurable differences between treated and control samples.

The amount of solids settled for both the static and dynamic tests was quantified. These comparisons were made both with and without treatments. All tests were conducted with 500 ml aliquots of stillage bottoms. The sediment height was recorded after 40 minutes. The supernatant was then withdrawn to the 200 ml mark, and the % solids of the remaining concentrated slurry was determined. The result of this analysis was that the percent solids of the sediment for two samples was the same. This indicates that both samples contain the same quantity of solids, and since the bed volume for the treated sample is greater, it is theorized that the treatment has decreased the bed density. Test results are shown in Tables I through IV. Table I demonstrates the observations from the Static Settling Tests. This table shows an increase in settled bed height due to addition of treatments relative to untreated settling tests which were run concurrently.

Table II displays comparative results for Static (without air sparging) vs. Dynamic (with air sparging) settling tests. These results also show an increase in settled bed height due to the addition of treatments relative to untreated settling tests which were run concurrently. The Dynamic tests demonstrate a similar relative increase in bed height due to the addition of treatments. Table III lists the results of the solids concentration analyses performed on the settled beds using the method described above. The treatment of the present invention may also be combined with lecithin or sorbitan ester monooleate in order to inhibit proteinaceous deposition on the heat transfer surfaces in the reboiler section of the beer still.

TABLE I

Static Settling Tests
Carboxymethylcellulose (CMC) Feedrate Study

| CMC Concentration (ppm) | % Change in Sediment Height |
|---|---|
| 0.1 | 22 |
| 0.7 | 20 |
| 1.0 | 26 |
| 7.0 | 47 |
| 1.0 | 80 |
| 300 | 72 |
| 500 | 45 |

$$\% \text{ change in Sediment Height} = \frac{\text{Sediment Height (Treatment)} - \text{Sediment Height (Control)}}{\text{Sediment Height (Control)}}$$

TABLE II

Static vs. Dynamic Settling Test Comparison

| Static Test (without air sparging) | | Dynamic Test (with air sparging) | |
|---|---|---|---|
| Treatment | Sediment Height (cc) | Treatment | Sediment Height (cc) |
| Control | 85 | Control | 20 |
| 10 ppm CMC | 170 | 10 ppm CMC | 30 |

TABLE III

% Solids of Sediment as a Function of Treatment and Test Type

| Static Test (without air sparging) | | Dynamic Test (with air sparging) | |
|---|---|---|---|
| Treatment | % Solids | Treatment | % Solids |
| Control | 7.8 | Control | 7.2 |
| 10 ppm CMC | 8.0 | 10 ppm CMC | 7.0 |

TABLE IV

Static Settling Tests - Raw Materials

| Treatment (10 ppm active) | % Change in Sediment Height |
|---|---|
| High Viscosity CMC | 81 |
| Low Viscosity CMC | 52.5 |
| Sodium Alginate | 27.5 |
| Polymer A | −15 |
| Polymer B | −11 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for inhibiting organic, proteinaceous deposition on heat transfer surfaces of a distillation system in contact with a stream consisting essentially of an alcohol distillation stream, which comprises adding to said alcohol distillation stream an effective inhibiting amount of an additive including an anionic polymer having a molecular weight from about 50,000–300,000, said anionic polymer selected from the group consisting of a carboxymethylcellulose, metal alginate, carrageenan gum and mixtures thereof, said additive decreasing the density of settled solids in said alcohol distillation stream.

2. The method as recited in claim 1 wherein said metal alginate is sodium alginate.

3. The method as recited in claim 1 wherein said additive is added to said alcohol distillation stream in an amount of from about 0.1 parts per million to about 100 parts per million.

4. The method as recited in claim 1 wherein said additive reduces the cohesiveness of settled solids in said alcohol distillation stream.

5. The method as recited in claim 1 wherein said alcohol distillation stream is processed using a beer still.

* * * * *